(12) United States Patent
Wang et al.

(10) Patent No.: US 8,023,207 B2
(45) Date of Patent: *Sep. 20, 2011

(54) CLUTCHING JIG

(75) Inventors: Chin-Chou Wang, Tu-Cheng (TW);
Yi-Chang Yang, Tu-Cheng (TW)

(73) Assignee: Cheng UEI Precision Industry Co., Ltd., Tu-Cheng, Taipei Hsien (TW)

( * ) Notice: Subject to any disclaimer, the term of this patent is extended or adjusted under 35 U.S.C. 154(b) by 35 days.

This patent is subject to a terminal disclaimer.

(21) Appl. No.: 12/550,143

(22) Filed: Aug. 28, 2009

(65) Prior Publication Data

US 2011/0051263 A1  Mar. 3, 2011

(51) Int. Cl.
*G02B 27/00* (2006.01)
*G02B 3/00* (2006.01)
*G02B 7/00* (2006.01)

(52) U.S. Cl. ........................................ 359/809; 359/819
(58) Field of Classification Search .................. 359/809, 359/818, 819, 827, 896
See application file for complete search history.

(56) References Cited

U.S. PATENT DOCUMENTS

2008/0068732 A1* 3/2008 Chiu et al. .................... 359/809

\* cited by examiner

*Primary Examiner* — Alicia M Harrington
(74) *Attorney, Agent, or Firm* — Cheng Ju Chiang

(57) ABSTRACT

A clutching jig is adapted to disassemble a lens module which includes a lens socket and a lens component mounted to the lens socket. The clutching jig includes a base and at least two inserting slices. The base defines two opposite lateral surfaces and a bottom surface. A slot passes through the opposite lateral surfaces and the bottom surface to divide the base into a first holding portion and a second holding portion. The bottom surface has a receiving recess at a portion thereof. The inserting slices are removably mounted to the opposite lateral surfaces and beyond the bottom surface. Wherein the inserting slices are inserted between the lens component and the lens socket, and the receiving recess receives the lens component with a circumferential dimension thereof lessened to clutch the lens component when the first holding portion and the second holding portion are urged to approach each other.

9 Claims, 6 Drawing Sheets

CLUTCHING JIG

BACKGROUND OF THE INVENTION

1. Field of the Invention

The present invention generally relates to a clutching jig, and more particularly to a clutching jig for conveniently disengaging a lens component from a lens socket.

2. The Related Art

As the digital products have been diversely developed, such as personal digital assistants (PDA), mobile phones, or other small portable terminal apparatuses, each of them is broadly combined with a miniature photographing device, like lens module, to perform the photographing function. The lens module includes a lens socket and a lens component provided in the lens socket. In the process of assembly and repair, the users usually need to clutch the lens component out of the lens socket.

Referring to FIG. 7, a traditional disengaging jig 7 includes a housing 71 having a square shape. A square hole 72 is formed in the middle of the housing 71. Three pressure plates 711 and a plywood 712 are protruded downward from each side of the housing 71 with the pressure plates 711 being against the plywood 712. A lens module includes a lens component 80 and a lens socket 90 for receiving the lens component 80. A groove 81 is formed in each corner of a lens base 82 of the lens component 80. A notch 91 is formed in each of inner sides of the lens socket 90. A buckling piece 92 is located in the notch 91 with a free end thereof buckled in the groove 81, so the lens component 80 is buckled firmly in the lens socket 90. The size of the lens socket 90 perfectly matches with the disengaging jig 7.

While the disengaging jig 7 is inserted into the lens socket 90, the buckling pieces 92 are pressed and pushed back into the notches 91 by the pressure plates 711, so the lens component 80 is not fastened by the buckling pieces 92. Then, the lens component 80 can be disengaged from the lens socket 90 by other jig devices. As described above, the disengaging jig 7 just releases the lens component 80 from the fastening of the buckling pieces 92 and is difficult to take out the lens component 80 from the lens socket 90 by itself.

SUMMARY OF THE INVENTION

An object of the present invention is to provide a clutching jig. The clutching jig is adapted to disassemble a lens module which includes a lens socket and a lens component mounted to the lens socket by a plurality of buckling pieces of the lens socket abutting to the lens component. The clutching jig includes a substantially rectangular base and at least two inserting slices. The base defines two opposite lateral surfaces and a bottom surface. A slot passes through the opposite lateral surfaces and the bottom surface to divide the base into a first holding portion and a second holding portion. The bottom surface has a receiving recess at a center portion thereof for communicating with the slot. The inserting slices are removably mounted to the opposite lateral surfaces and beyond the bottom surface. Wherein the inserting slices are inserted between the lens component and the lens socket for disengaging the lens component from the buckling pieces, and the receiving recess receives the lens component with a circumferential dimension thereof lessened to clutch the lens component when the first holding portion and the second holding portion are urged to approach each other.

As described above, the clutching jig of the present invention is provided with the slot to disengage the holding portions, which are urged to approach each other for holding the lens component. Therefore, the structure of the clutching jig is simple and the clutching jig is able to clutch the lens component out of the lens socket easily without using other jig devices any more. Furthermore, the clutching jig of the present invention makes the inserting slice removably located on the base so as to replace broken inserting slices conveniently and lengthen the using life of the clutching jig.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
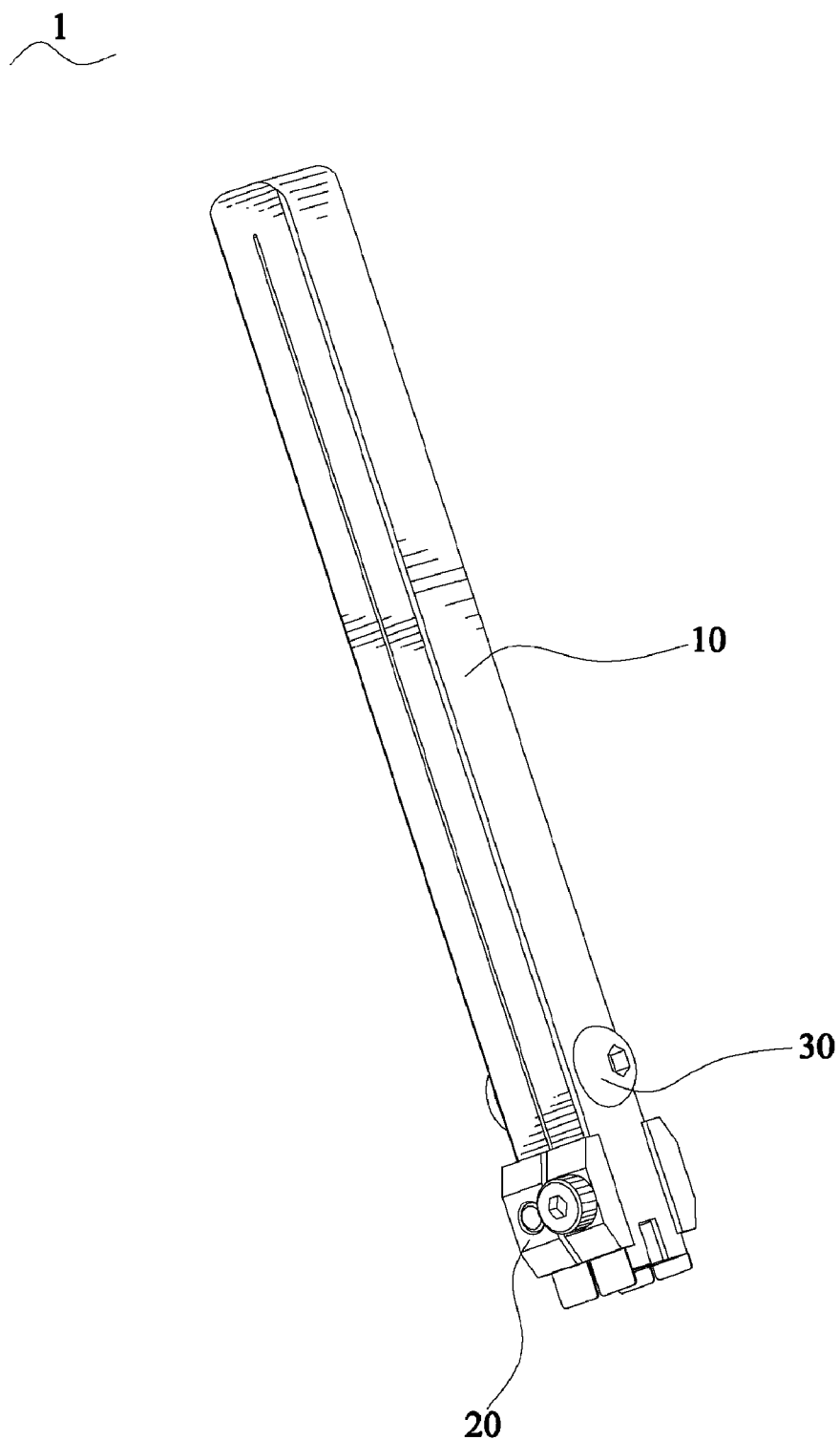
FIG. 1 is a perspective view of a clutching jig according to the present invention.
Figure 2:
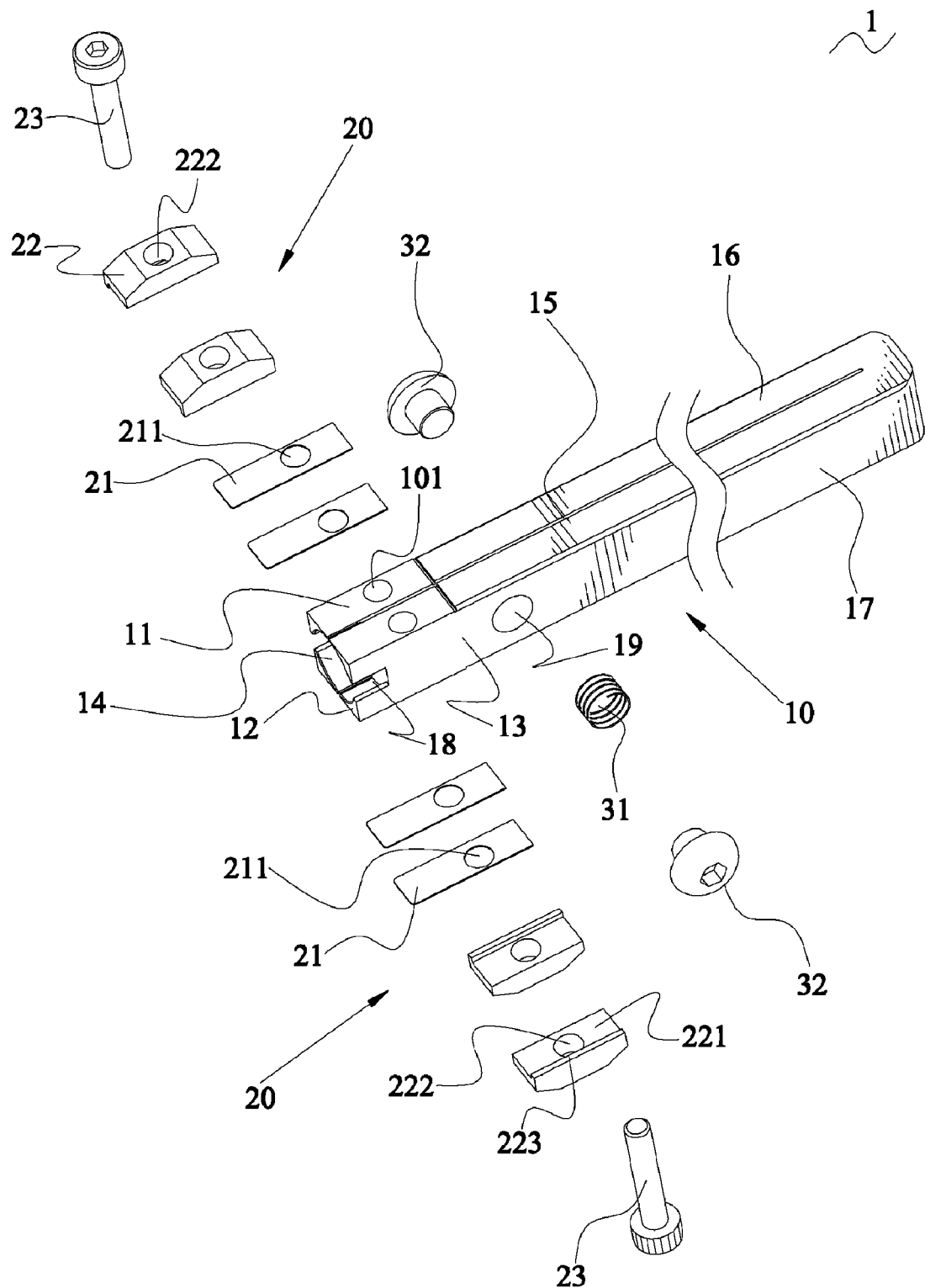
FIG. 2 is an exploded view of the clutching jig of FIG. 1.

Referring to FIGS. 1-2, a clutching jig 1 according to the present invention is shown. The clutching jig 1 includes a base 10, a pair of inserting means 20 and an elastic device 30 assembled to the base 10 respectively.

Figure 3:
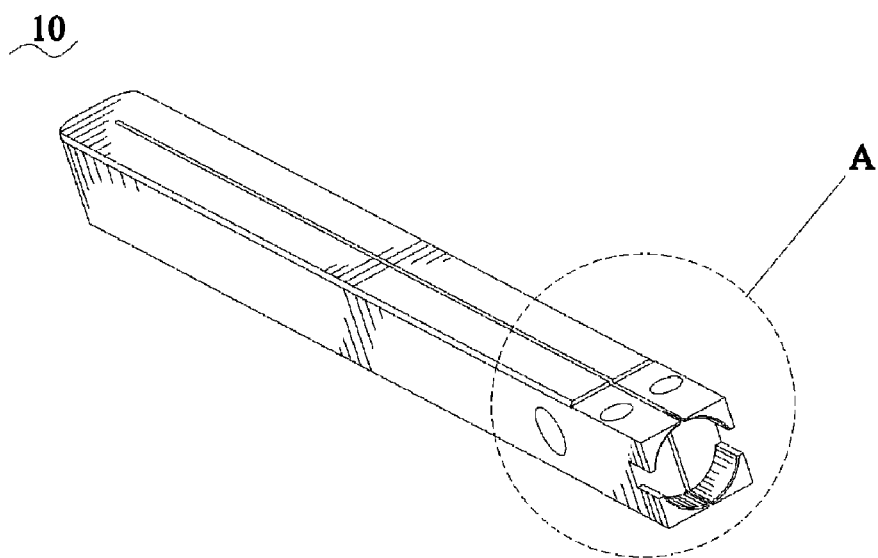
FIG. 3 is a perspective view of a base of the clutching jig of FIG. 1.
Figure 4:
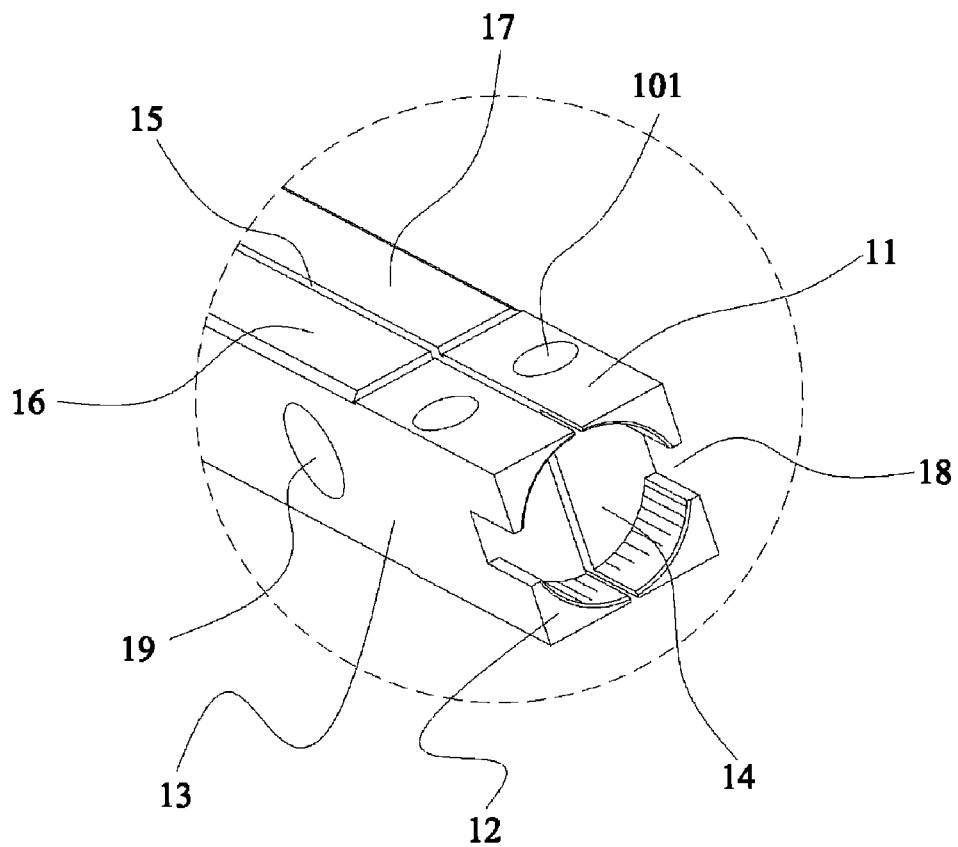
FIG. 4 is an enlarged view of an encircled portion A of the base of FIG. 3.

Referring to FIGS. 2-4, the base 10 is of rectangular shape and disposed vertically. The base 10 defines two opposite lateral surfaces 11 and a bottom surface 12, and the other opposite surfaces are defined as two side surfaces 13. The bottom surface 12 is formed with a circular receiving recess 14 at a middle portion thereof. A slot 15 is defined at a middle portion of the lateral surface 11 along an extending direction. The slot 15 passes through the whole base 10 along the extending direction of the base 10 and reaches the bottom surface 12 to divide the base 10 into a first holding portion 16 and a second holding portion 17. The slot 15 communicates with the receiving recess 14. Two opposite sidewalls of the receiving recess 14 define a pair of rectangular fool-proof gaps 18 passing through the respective side surfaces 13 and each having a substantially equal distance from the two opposite lateral surfaces 11. A lower portion of the base 10 defines a locating trough 19 extending perpendicularly to the slot 15 to pass through the holding portions 16, 17 and the side surfaces 13. The locating trough 19 communicates with the slot 15 and is higher than the receiving recess 14. The base 10 further defines a pair of parallel positioning apertures 101, one of which penetrates through the first holding portion 16 and the two opposite lateral surfaces 11, and the other penetrates through the second holding portion 17 and the two opposite lateral surfaces 11. The pair of positioning apertures 101 is symmetrical about the slot 15 and located between the receiving recess 14 and the locating trough 19.

Referring to FIG. 2, each of the inserting means 20 includes a pair of inserting slices 21, a pair of holding blocks 22 and a fixing means 23 for mounting the inserting means 20 to the base 10. The fixing means 23 is a pin in this embodiment. Each of the inserting slices 21 is of rectangular shape and defines a first connecting hole 211 passing therethrough. Each of the holding blocks 22 has a base board 221. The base board 221 is of substantially rectangular shape and defines a second connecting hole 222 passing through a middle thereof. A side edge of the base board 221 protrudes towards a direction perpendicular to the base board 221 to form a protecting board 223 extending along the extending direction of the base board 221. The elastic device 30 includes an elastic element 31 and a pair of fixing elements 32 for engaging the elastic element 31 to the base 10. In this embodiment, the elastic element 31 is a spring and each of the fixing elements 32 is a screw.

Referring to FIGS. 1-5, when the clutching jig 1 is assembled, the pair of inserting means 20 are mounted to the two lateral surfaces 11 of the base 10 respectively. The inserting slices 21 and the corresponding holding blocks 22 of each inserting means 20 are respectively located onto the corresponding holding portions 16, 17 with the inserting slice 21 being clipped between the base board 221 of the corresponding holding block 22 and the lateral surface 11 of the first/second holding portion 16/17 and stretching beyond the bottom surface 12 of the base 10. The first connecting hole 211, the second connecting hole 222 and the corresponding positioning aperture 101 are connected with one another to make the pin 23 pass therethrough so as to fasten the inserting slice 21 and the corresponding holding block 22 to the base 10 by means of the pin 23, wherein the two inserting slices 21 on the two opposite lateral surfaces 11 of the first/second holding portion 16/17 and the corresponding two holding blocks 22 can be fastened by one same pin 23. The protecting board 223 of the holding block 22 abuts against the corresponding side surface 13 of the base 10 to protect the corresponding inserting slice 21. The spring 31 is put into a middle of the locating trough 19 to bestride the holding portions 16, 17 by means of the pair of screws 32 being fastened in two ends of the locating trough 19 in the holding portions 16, 17 respectively and further inserted into two ends of the spring 31.

Figure 5:
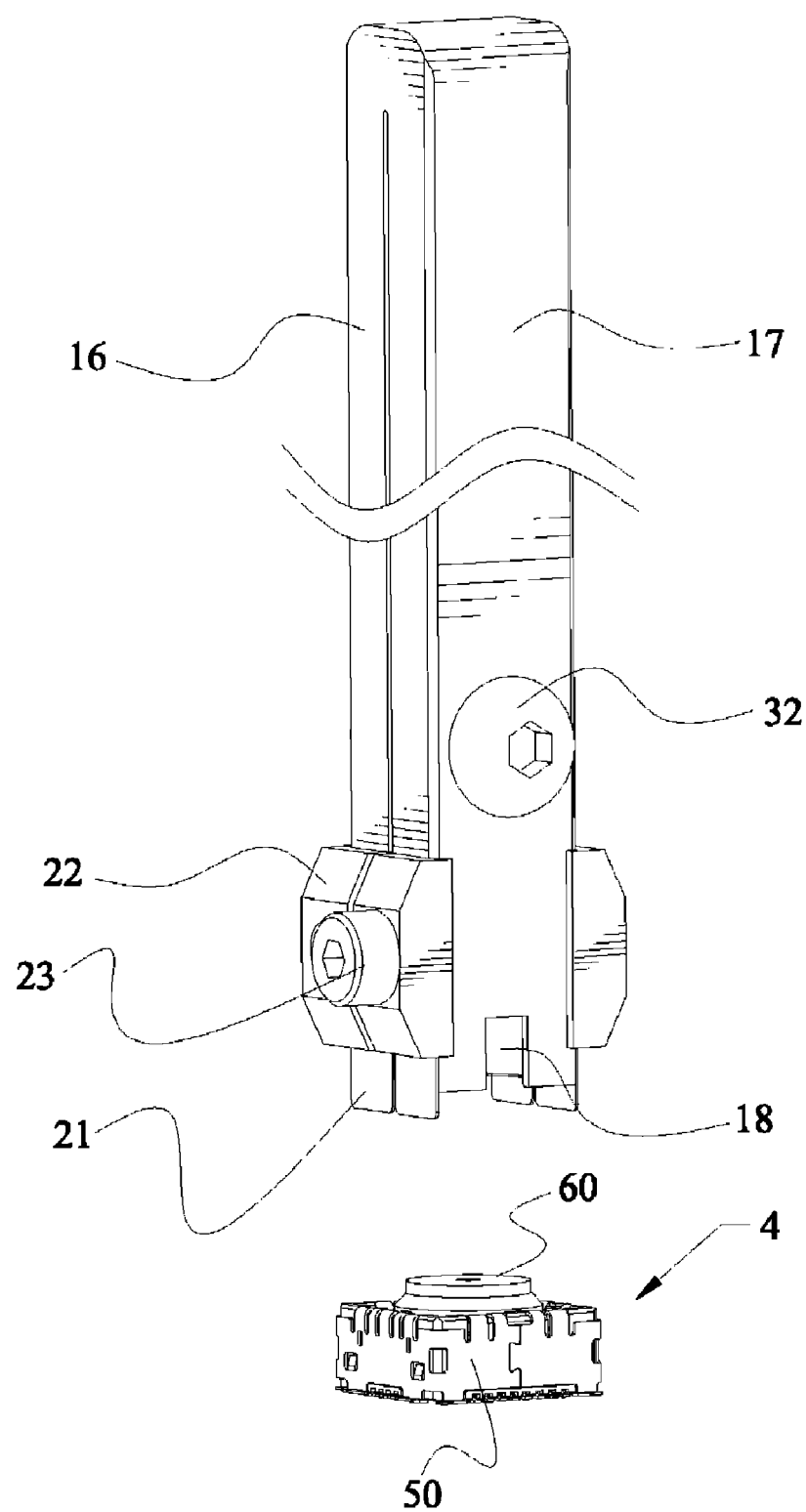
FIG. 5 is a perspective view of the clutching jig shown in FIG. 1, wherein a lens module is provided.
Figure 6:
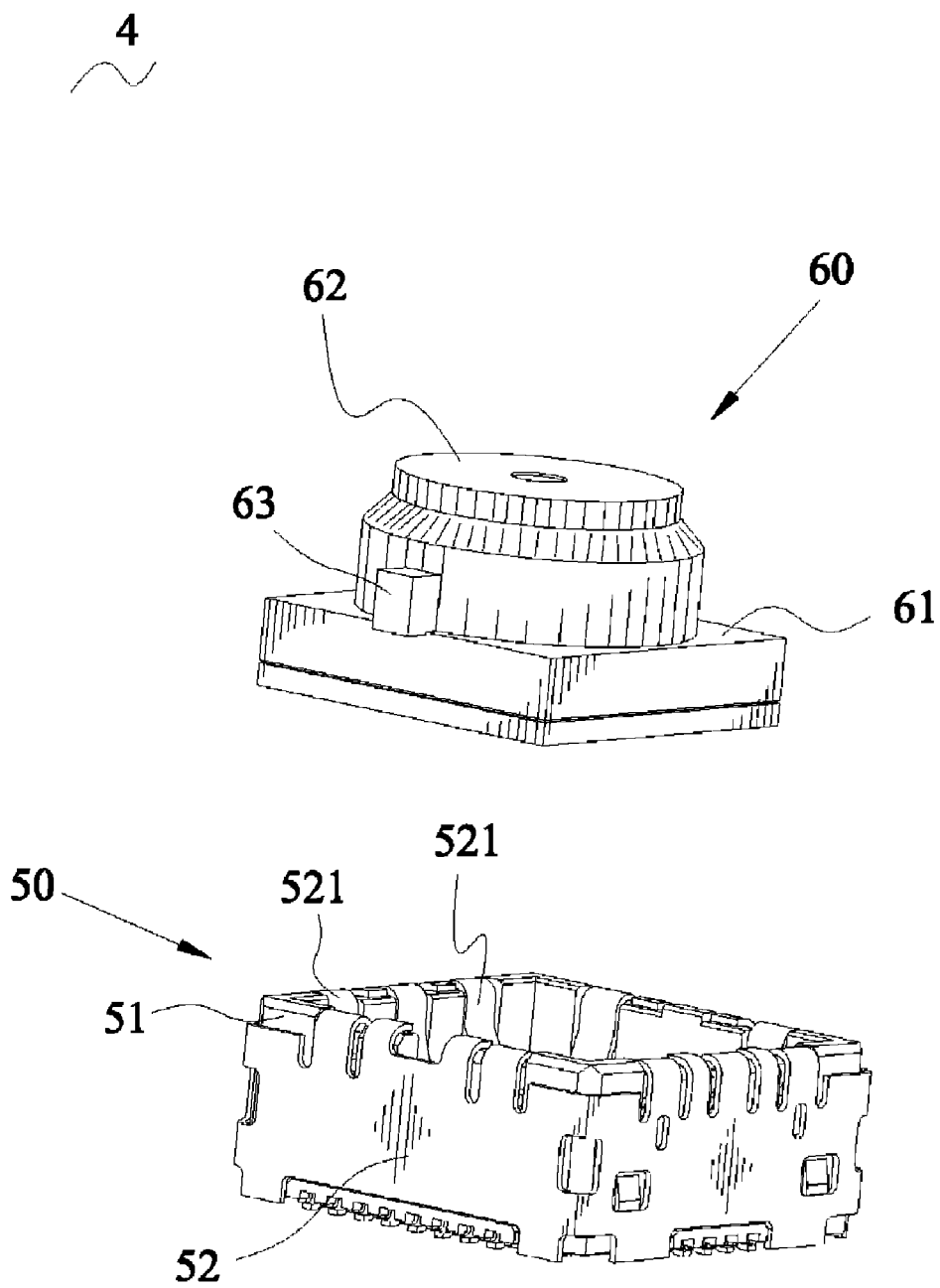
FIG. 6 is an exploded view of the lens module of FIG. 5.
Figure 7:
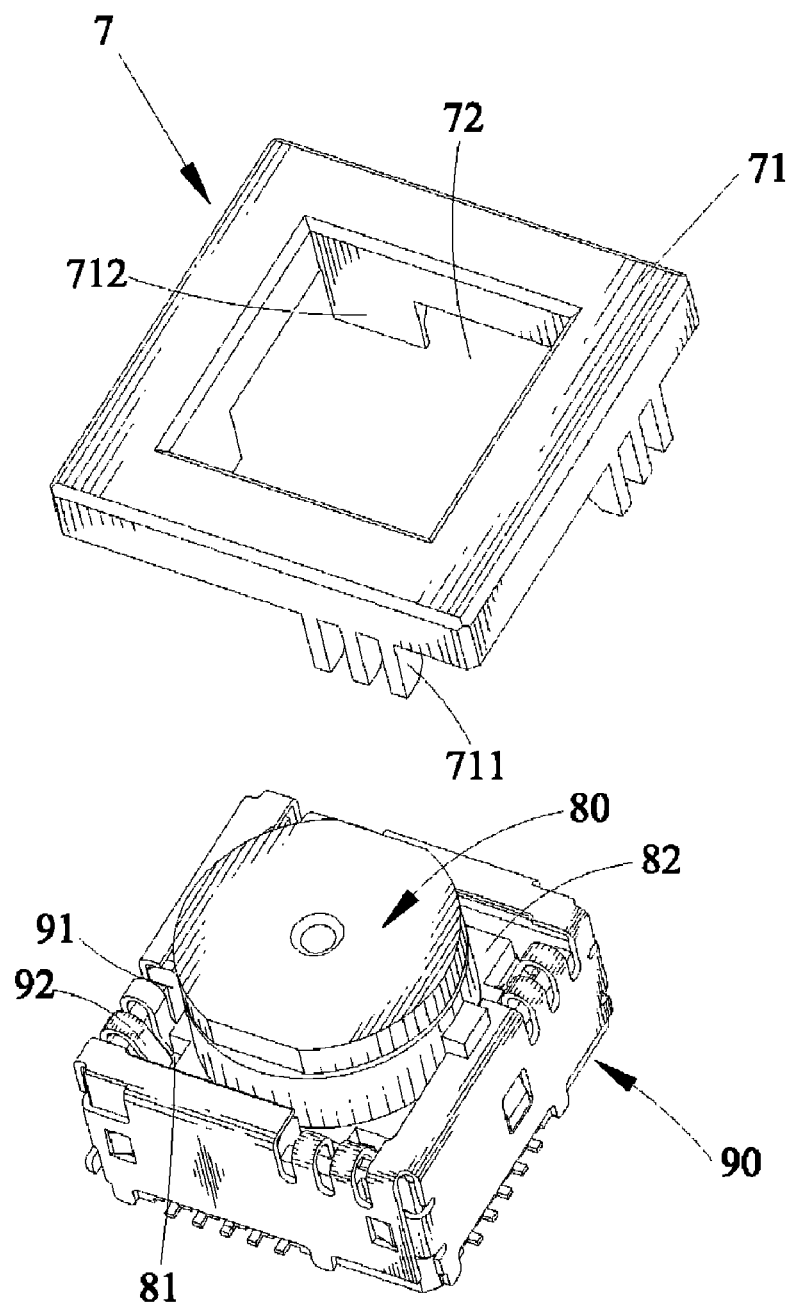
FIG. 7 is a perspective view of a disengaging jig in prior art, wherein a lens module is provided.

Referring to FIG. 5 and FIG. 6, a lens module 4 includes a lens socket 50 and a lens component 60 disposed into the lens socket 50. The lens component 60 has a lens base 61 and a round lens body 62 located on the lens base 61. The lens body 62 has a pair of fool-poof projections 63 oppositely protruded outward from a peripheral side thereof. The lens socket 50 has an insulating housing 51 and a metal shell 52 enclosing the insulating housing 51. The metal shell 52 has a plurality of buckling pieces 521 which project inward to abut against a top and sidewalls of the lens base 61 for fastening the lens component 60 in the lens socket 50 firmly after the lens component 60 being inserted into the lens socket 50.

Referring to FIGS. 2-6, when the clutching jig 1 is used to disengage the lens component 60 from the lens socket 50, the clutching jig 1 is firstly adjusted and positioned by the fool-proof projections 63 inserted into the corresponding fool-proof gaps 18. The lens body 62 is received in the receiving recess 14. The bottom surface 12 of the clutching jig 1 faces and relies on the top of the lens base 61, so that the buckling pieces 521 are urged to be apart from the lens component 60. The inserting slices 21 are inserted between the lens socket 50 and the lens component 60 to press the buckling pieces 521 against the sidewalls of the lens base 61. Thus the lens component 60 is disengaged from the buckling pieces 521. At this time, the holding portions 16, 17 are gripped to approach each other to clutch the lens component 60, and pulled upwardly with the lens component 60 to release the lens component 60 from the lens socket 50. Then the holding portions 16, 17 can automatically regain a free state by means of the stored elasticity of the spring 31 of the elastic device 30.

As described above, the clutching jig 1 of the present invention is provided with the slot 15 to disengage the holding portions 16, 17, which are urged to approach each other for holding the lens component 60. Therefore, the structure of the clutching jig 1 is simple and the clutching jig 1 is able to clutch the lens component 60 out of the lens socket 50 easily without using other jig devices any more. Furthermore, because the inserting slice 21 is apt to be damaged due to the repeatedly inserted into and pulled out of the lens module 4, the clutching jig 1 of the present invention makes the inserting slice 21 removably located on the base 10 by means of the pin 23 so as to replace broken inserting slices conveniently and lengthen the using life of the clutching jig 1.

The forgoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A clutching jig adapted to disassemble a lens module which includes a lens socket and a lens component mounted to the lens socket by a plurality of buckling pieces of the lens socket abutting to the lens component, comprising:
   a substantially rectangular base, the base defining two opposite lateral surfaces, a bottom surface, and a slot passing through the opposite lateral surfaces and the bottom surface to divide the base into a first holding portion and a second holding portion, the bottom surface having a receiving recess at a center portion thereof for communicating with the slot; and
   at least two inserting slices removably mounted to the opposite lateral surfaces and beyond the bottom surface, wherein the inserting slices are inserted between the lens component and the lens socket for disengaging the lens component from the buckling pieces, and the receiving recess receives the lens component with a circumferential dimension thereof lessened to clutch the lens component when the first holding portion and the second holding portion are urged to approach each other.

2. The clutching jig as claimed in claim 1, further comprising at least two holding portions, each of the inserting slices being clipped between one holding portion and the corresponding lateral surface of the base by means of a removable fixing means.

3. The clutching jig as claimed in claim 2, wherein the fixing means is a pin.

4. The clutching jig as claimed in claim 2, wherein the holding portion has a base board and an edge of the base board extends perpendicularly to the base board to form a protecting board for protecting the corresponding inserting slice.

5. The clutching jig as claimed in claim 1, wherein a sidewall of the receiving recess defines a fool-proof gap which has a substantially equal distance from the two opposite lateral surfaces.

6. The clutching jig as claimed in claim 1, further comprising an elastic device including an elastic element which is elastically mounted in the base to bestride the first and second holding portions for providing elasticity to the clutching jig.

7. The clutching jig as claimed in claim 6, wherein the elastic element is a spring.

8. The clutching jig as claimed in claim 6, wherein a pair of fixing elements is oppositely fastened in the first holding portion and the second holding portion respectively to be further inserted into two ends of the elastic element.

9. The clutching jig as claimed in claim 8, wherein the fixing element is a screw.

* * * * *